(12) United States Patent
Stoops et al.

(10) Patent No.: US 11,063,943 B2
(45) Date of Patent: Jul. 13, 2021

(54) SYSTEM AND METHOD FOR RE-AUTHENTICATION OF ASYNCHRONOUS MESSAGING

(71) Applicant: Genesys Telecommunications Laboratories, Inc., Daly City, CA (US)

(72) Inventors: Daniel Stoops, Powell, OH (US); Cliff Bell, Kalispell, MT (US)

( * ) Notice: Subject to any disclaimer, the term of this patent is extended or adjusted under 35 U.S.C. 154(b) by 123 days.

(21) Appl. No.: 16/180,276

(22) Filed: Nov. 5, 2018

(65) Prior Publication Data

US 2019/0141039 A1    May 9, 2019

Related U.S. Application Data

(60) Provisional application No. 62/582,876, filed on Nov. 7, 2017.

(51) Int. Cl.
| | |
|---|---|
| *H04L 29/06* | (2006.01) |
| *H04L 12/58* | (2006.01) |
| *H04L 29/08* | (2006.01) |
| *H04W 12/06* | (2021.01) |

(52) U.S. Cl.
CPC .......... *H04L 63/0884* (2013.01); *H04L 51/00* (2013.01); *H04L 51/02* (2013.01); *H04L 51/046* (2013.01); *H04L 51/16* (2013.01); *H04L 63/083* (2013.01); *H04L 63/0861* (2013.01); *H04L 67/20* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2001/0000535 A1* | 4/2001 | Lapsley | G06Q 20/0855 705/64 |
| 2007/0156836 A1 | 7/2007 | Kelso et al. | |
| 2008/0086564 A1 | 4/2008 | Putman et al. | |
| 2010/0029306 A1* | 2/2010 | Sarmah | G06Q 20/3223 455/466 |
| 2010/0306668 A1 | 12/2010 | Williams, III et al. | |
| 2012/0016678 A1* | 1/2012 | Gruber | G10L 15/22 704/275 |

(Continued)

OTHER PUBLICATIONS

Kimberling, "How to Use Deep Linking in Your Mobile App." Aug. 19, 2015 (Aug. 19, 2015) Retrieved from ,https://savvyapps.com/blog/how-to-use-deep-linking-in-your-mobile-app> entire document (Year: 2015).*

(Continued)

*Primary Examiner* — Andrew J Steinle

(57) ABSTRACT

A system and method are presented for the re-authentication of asynchronous messaging, specifically within enterprise to consumer communications. A third-party enterprise messaging server may be used as a conduit for a messaging service allowing for customer interaction with a business. The messaging server can append a re-authentication process for customers once a customer has been authenticated by the enterprise. Each time a customer resumes an interaction exceeding a timeout threshold, the messaging server invokes its re-authentication process. Lapsed interactions may be treated as continuous without having the customer re-authenticate through the enterprise specific authentication.

30 Claims, 5 Drawing Sheets

(56) References Cited

U.S. PATENT DOCUMENTS

2014/0082715 A1    3/2014  Grajek et al.
2017/0048170 A1    2/2017  Smullen et al.
2017/0085563 A1*   3/2017  Royyuru ............ G06Q 30/0277

OTHER PUBLICATIONS

Search Report and Written Opinion of the International Searching Authority, dated Feb. 1, 2019 in related PCT application PCT/US2018/059151 filed Nov. 5, 2018.
Kimberling, "How to Use Deep Linking in Your Mobile App," Aug. 19, 2015. Retrieved from <https://savvyapps.com/blog/how-to-use-deep-linking-in-your-mobile-app>.
New Zealand Examination Report regarding co-pending application No. 764871 dated Jul. 7, 2020.
Australian Examination Report regarding co-pending applicaiton No. 2018365791 dated Jul. 3, 2020.
European Search Report for co-pending EP application No. 18875250.5.
Cody Kimberling: "How to Use Deep Linking in Your Mobile App", Savvy Apps, Aug. 19, 2015. https://savvyapps.com/blog/how-to-use-deep-linking-in-your-mobile-app.
European Examination Report for co-pending EP application 18875250.5.
Australian Examination Report for co-pending AU application 2018365791.
New Zealand Second Examination Report for co-pending application No. 764871 dated Feb. 2, 2021.

* cited by examiner

SYSTEM AND METHOD FOR RE-AUTHENTICATION OF ASYNCHRONOUS MESSAGING

CROSS REFERENCE TO RELATED APPLICATION

This application claims the benefit of U.S. Provisional Application No. 62/582,876, filed Nov. 7, 2017, titled "SYSTEM AND METHOD FOR RE-AUTHENTICATION OF ASYNCHRONOUS MESSAGING", the contents of which are incorporated herein.

BACKGROUND

The present invention generally relates to telecommunications systems and methods, as well as authentication processes. More particularly, the present invention pertains to messaging in an enterprise to customer setting and the authentication processes within.

SUMMARY

A system and method are presented for the re-authentication of asynchronous messaging, specifically within enterprise to consumer communications. A third-party enterprise messaging server may be used as a conduit for a messaging service allowing for customer interaction with a business. The messaging server can append a re-authentication process for customers once a customer has been authenticated by the enterprise. Each time a customer resumes an interaction exceeding a timeout threshold, the messaging server invokes its re-authentication process. Lapsed interactions may be treated as continuous without having the customer re-authenticate through the enterprise specific authentication.

In one embodiment, a method is described for authentication in a persistent conversation in an asynchronous communication channel comprising: providing input by a first party initiating a conversation through an asynchronous communication channel; receiving the conversation, by an enterprise messaging server, and determining the conversation to be handled by an automated response; routing, by the enterprise messaging server, the conversation to a third-party application automation platform; authenticating, by the third-party application automation platform, the identity of the first party and continuing the conversation if the party is authenticated, otherwise, terminating the conversation; and re-authenticating the identity of the first party, wherein the third-party application authentication is invoked to perform authentication using biometrics.

In another embodiment, a method is presented for authentication in a persistent conversation in an asynchronous communication channel comprising: providing input by a first party initiating a conversation through an asynchronous communication channel; receiving the conversation, by an enterprise messaging server, and determining the conversation to be handled by an automated response; routing, by the enterprise messaging server, the conversation to a third-party application automation platform; authenticating, by the third-party application automation platform, the identity of the first party and continuing the conversation if the party is authenticated, otherwise, terminating the conversation; selecting, by the first party, a PIN upon prompting by the third-party application platform; and re-authenticating the identity of the first party, wherein the third-party application authentication is invoked to perform authentication wherein the first party is prompted for the PIN.

In another embodiment, a method is presented for authentication in a persistent conversation in an asynchronous communication channel comprising: providing input by a first party initiating a conversation through an asynchronous communication channel; receiving the conversation, by an enterprise messaging server, and determining the conversation to be handled by an automated response; routing, by the enterprise messaging server, the conversation to a second party, wherein the second party initiates authentication; authenticating, by a third-party application automation platform, the identity of the first party and continuing the conversation by the second party if the first party is authenticated, otherwise, terminating the conversation; selecting, by the first party, a PIN upon prompting by the third-party application platform; and re-authenticating the identity of the first party, wherein the third-party application authentication is invoked to perform authentication wherein the first party is prompted for the PIN.

DETAILED DESCRIPTION

Figure 1:
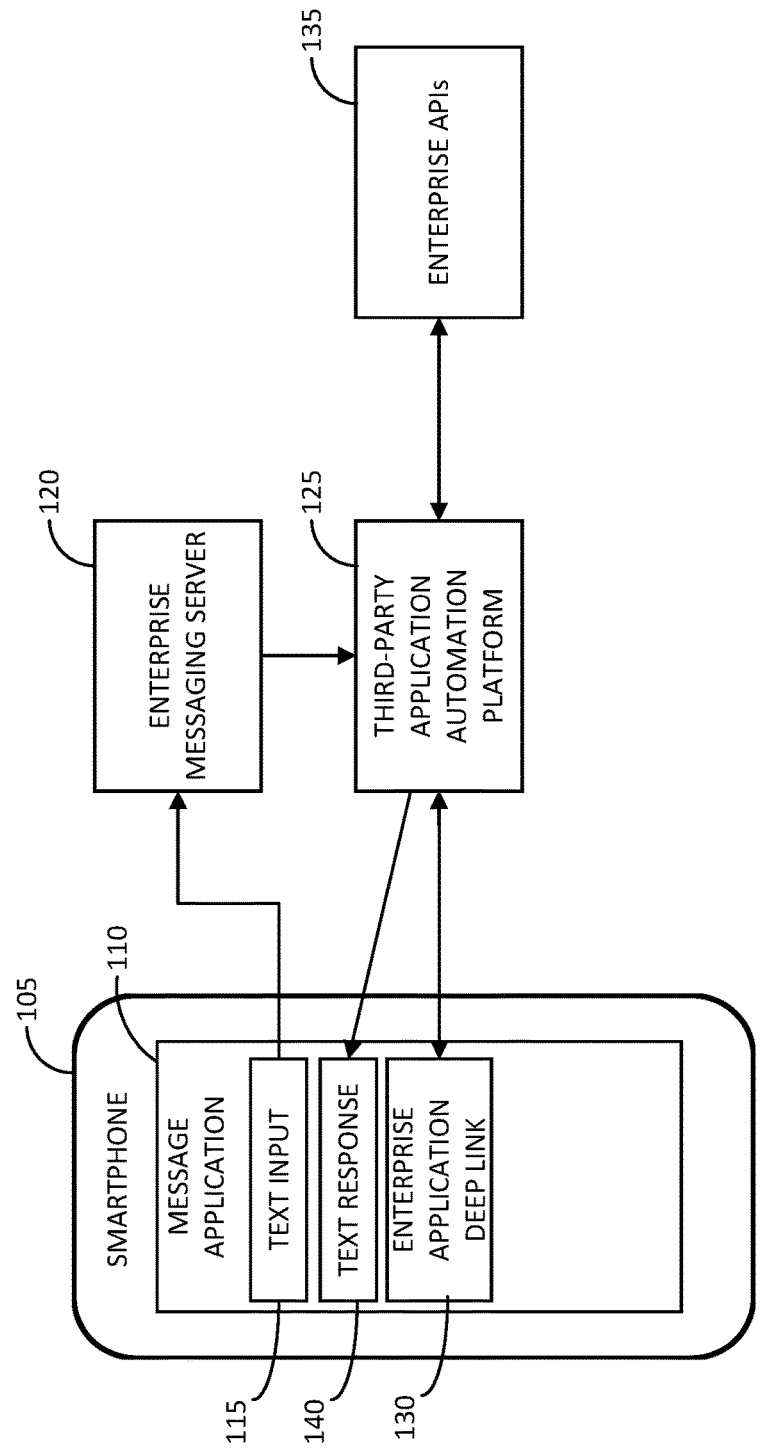
FIG. 1 is a diagram illustrating an embodiment of re-authentication in an asynchronous communication.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Asynchronous messaging describes a communication method between two applications or systems which creates long-lived conversations. A message from a first party may be placed in a queue which does not require an immediate response by another party to continue processing. The conversation may persist on the first party's device. For example, a messaging conversation between two people within a messaging service (such as iPhone Messages or Facebook Chat) will be present and persistent for months.

In peer-to-peer messaging, it is assumed that the message sender is who they say they are. This can be problematic when a different individual takes control of the original sender's device. The new person can reply to a conversation under the guise of the original message sender without the recipient being aware of the sender's identity change. Within peer-to-peer messaging, a device can be determined and authenticated, but validating the author of a message to be the owner of the device is problematic.

In a scenario where an individual is asynchronously messaging with an enterprise, more authentication information is necessary than with simple peer-to-peer communications. An individual may be a customer reaching out to a service provider. The customer may be required to provide additional details to authenticate their identity, such as an account number, the last four numbers of a government identification number, etc. This allows for an enterprise to be more certain of the identity of the customer and then leverage that identity to access information about the customer within an enterprise's databases at the onset of the communication. However, once authentication is complete, there is not an easy method of determining that, after some period of time has lapsed, the customer is still the author of subsequent messages in the conversation.

One way of determining whether the customer is still the author is to re-authenticate the customer in the same manner as the original authentication. For example, an enterprise, such as a bank, may ask a customer to authenticate by providing an account number and a password. At the onset of the asynchronous communication interaction, the customer provides this information. Usually, the customer will have to look up the information as customers typically do not readily know their bank account numbers from memory. As the interaction progresses, the customer may become side-tracked and not respond to the conversation for several more hours. When the customer re-engages the bank, the bank would need to re-authenticate the customer and ask for the identifying information again to continue with the interaction. The customer would have to again look up the information, provide it, and be re-authenticated by the bank. In another example, an enterprise may have specific time lapses where re-authentication is performed, such as every fifteen minutes.

Thus, a repeated burden is placed on the customer each time they want to resume the conversation with the bank after a pause or lapsed period of time. This is a cumbersome departure from the peer-to-peer messaging experience where no additional confirmation of identity inhibits the messaging thread. This burden could deter the customer from wanting to use a messaging or chat channel to continue conversations with enterprises using asynchronous messaging. Therefore, a way of determining that the author of the message is still in possession of the communication device and that the author is still the originally authenticated customer is needed.

FIG. 1 is a diagram illustrating an embodiment of re-authentication in asynchronous communication in an enterprise to consumer communication system, indicated generally at 100. Components of the system 100 might include a smartphone 105, a message application 110 installed on the smartphone 105, a field for text input 115 within the message application 110, an enterprise messaging server 120, a third-party application automation platform 125, an enterprise application deep link 130, enterprise APIs 135, and a field for text responses 140.

Continuing with the example of a bank and customer interaction through an asynchronous communication channel, the banking customer may want to know their account balance. The customer decides to use their smartphone 105 to connect with their bank through a messaging channel. A smartphone may comprise Apple Inc.'s iPhone, for example. The connection may be initiated through a smartphone messaging application 110, such as Business Chat by Apple Inc., or a similar service which allows for customer interaction with a business or enterprise. In a non-limiting example, the customer may initiate a conversation with their bank by typing a message to their bank in the messaging application 110. The customer may type a question, such as "what's my checking account balance", through a text input field 115. The question is received by the enterprise messaging server 120. An example of an enterprise messaging server might include Genesys® Hub, or a similar product capable of allowing customers to connect with enterprises through a number of devices (e.g., tablets, smartphones, smart appliances, smart watches, etc.) and platforms (e.g., social media, messaging applications, etc.). The customer input may be analyzed by the enterprise messaging server 120 to determine intent. In an embodiment, the analysis may be performed with Natural Language Understanding (NLU). An intent is discerned from the analysis and the resulting intent, <Balance Request> for example, may be determined to be handled by an automated response and routed to a third-party application automation platform 125. An example of a third-party application automation platform might include Genesys® Intelligent Automation or a similar platform capable of conversation automation.

The third-party application automation platform 125 determines that the request needs authentication and responds with a deep link 130 to the enterprise's application (e.g., the bank's banking application), which has been downloaded to the customer's smartphone 105. An example of a deep link comprises a direct link to an installed smartphone application. The customer may then select the deep link presentation 130 to invoke customer authentication by the enterprise application. In an embodiment, referring to the customer and their bank, the banking application may appear on the screen of the customer's device and direct the customer to enter details about their banking account related to the requested information. The customer may not have immediate access to the information the banking application needs to complete the authentication. The customer must search to find the requested information and then input the information to the banking application.

Inputs are authenticated by the application against back-end application programming interfaces (APIs) 135. Thus, the banking application would authenticate the inputs against the banks backend APIs. In an embodiment, because the banking application was initiated by the messaging application, the authentication response may be sent from the banking application back to the third-party automation platform 125. Now that the customer has been authenticated, the account balance may be retrieved from the bank through the bank's API 135 by the third-party application automation platform 125 and returned to the customer through the messaging application 110 as a text response 140.

After some delay, perhaps 45 minutes later, the customer may decide they would like additional information, such as their savings account balance. The customer will be required to undergo the same authentication process again. The customer messages the bank through the messaging application 110 on their smartphone 105 that they would like to know how much money is in their savings account. In a non-limiting example, the customer may type a message to their bank in the messaging application 110, "what's my savings account balance" through the text input field 115. The question is received by the enterprise messaging server 120. The customer input is analyzed by the enterprise messaging server 120 through Natural Language Understanding (NLU) and the resulting intent, <Balance Request>, for example, is determined to be handled by an automated response and routed to a third-party application automation platform 125.

The third-party application automation platform 125 determines that enough time has lapsed that the original authenticated session has expired and re-authentication is necessary. As a result, a response may be returned with a deep link 130 to the bank's banking application. The customer must again select the deep link presentation 130 to invoke customer authentication by the banking application. The banking application may again appear on the screen and direct the customer to enter details about their banking account related to the requested information. The customer may not have immediate access to the information the banking application needs to complete the authentication and must retrieve this information a subsequent time in order to complete the process. The customer sifts through information to find the details and then re-inputs the information to the banking application. The inputs are authenticated against the bank's backend APIs 135. The authentication response is also sent from the banking application back to the third-party automation platform 125. Now that the customer has been re-authenticated, the account balance may be retrieved from the bank through the bank's API 135 by the third-party application automation platform 125 and returned to the customer through the messaging application 110 as a text response 140.

Figure 2:
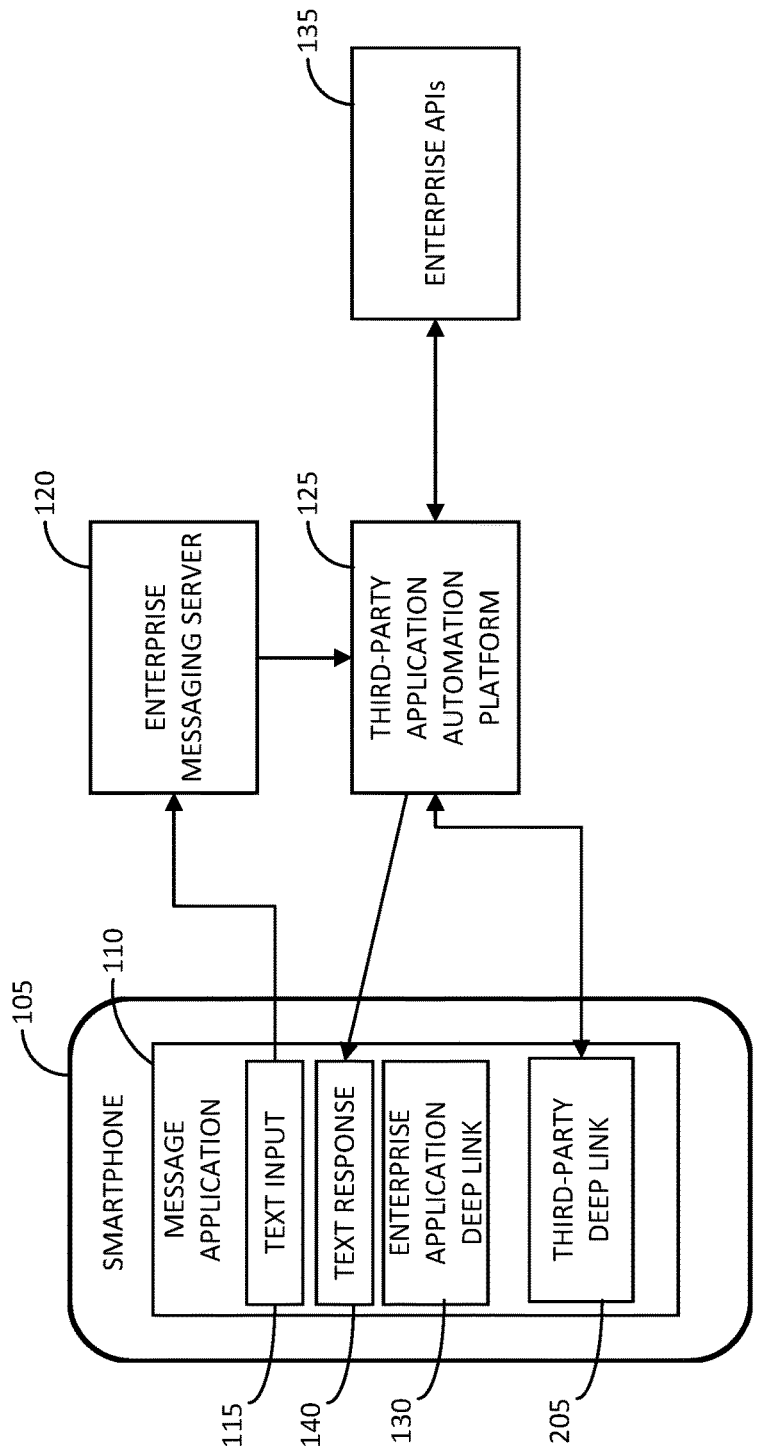
FIG. 2 is a diagram illustrating an embodiment of re-authentication in an asynchronous communication.

FIG. 2 is a diagram illustrating another embodiment of re-authentication in asynchronous communication in an enterprise to consumer communication system, indicated generally at 200. Components of the system 200 might include a smartphone 105 (or an other device capable of enabling customer communication with an enterprise messaging server), a message application 110 installed on the smartphone or device 105, a field for text input 115 within the message application 110, an enterprise messaging server 120, a third-party application automation platform 125, an enterprise application deep link 130, enterprise APIs 135, a field for text responses 140, and a third-party deep link 205.

In a scenario similar to that presented in FIG. 1, a banking customer may want to know their account balance. In an embodiment, the customer decides to use their smartphone 105 to connect with their bank through a messaging channel A smartphone may comprise Apple Inc.'s iPhone, for example. The connection may be initiated through a smartphone messaging application 110, such as Business Chat by Apple Inc. or a similar service which allows for customer interaction with a business. In a non-limiting example, the customer may initiate a conversation with their bank by typing a message to their bank in the messaging application 110. The customer may type a question, such as "what's my checking account balance", through a text input field 115. The question is received by the enterprise messaging server 120. An example of an enterprise messaging server might include Genesys® Hub, or a similar product capable of allowing customers to connect with enterprises through a number of devices (e.g., tablets, smartphones, smart appliances, smart watches, etc.) and platforms (e.g., social media, messaging applications, etc.). The customer input is analyzed by the enterprise messaging server 120 through NLU and the resulting intent, <Balance Request>, for example, is determined to be handled by an automated response and routed to a third-party application automation platform 125. An example of a third-party application automation platform 125 might include Genesys® Intelligent Automation or a similar platform capable of conversation automation.

The third-party application automation platform 125 determines that the request needs authentication and responds with a deep link 130 to the bank's banking application, which has been downloaded to the customer's smartphone 105. An example of a deep link comprises a direct link to an installed smartphone application. The customer selects the deep link presentation 130 to invoke customer authentication by the banking application. The banking application may appear on the screen and direct the customer to enter details about their banking account related to the requested information. The customer may not have access to the information the banking application needs to complete the authentication. The customer sifts through information to find the details and then inputs the information to the banking application. The inputs are authenticated by the banking application against the bank's backend APIs 135. Because the banking application was initiated by the messaging application, the authentication response is also sent from the banking application back to the third-party application automation platform 125. Now that the customer has been authenticated, the account balance may be retrieved from the bank through the bank's API 135 by the third-party application automation platform 125 and returned to the customer through the messaging application 110 as a text response 140.

In an embodiment, biometrics may be used to authenticate the customer. The third-party application automation platform 125 sends a deep link 205 to the smartphone 105. The customer selects the deep link presentation 205 to invoke the third-party application authentication. Instead of the authentication process as previously described in FIG. 1, when the customer presses on the deep link presentation 205, the third-party application authentication is invoked, which in this instance uses biometrics to authenticate the customer. The biometrics may be tied to the technology within the smartphone or device 105. The third-party deep link 205 application may make API calls to the biometric features of the smartphone 105. The biometrics may be in the form of a thumbprint provided by the customer, or facial recognition, heartbeat patterns, speech recognition, etc., to name a few non-limiting examples. Once the customer provides the requested biometrics, the authentication response is sent back to the third-party application automation platform 125.

After some delay, perhaps 45 minutes later, the customer may decide they would like additional information, such as their savings account balance. Referring to FIG. 2, the customer messages the bank through the messaging application 110 on their smartphone 105 that they would like to know how much money is in their savings account. In a non-limiting example, the customer may type a message to their bank in the messaging application 110, "what's my savings account balance" through the text input field 115. The question is received by the enterprise messaging server 120. The customer input is analyzed by the enterprise messaging server 120 through NLU and the resulting intent, <Balance Request>, for example, is determined to be handled by an automated response and routed to a third-party application automation platform 125.

The third-party application automation platform 125 determines that enough time has lapsed that the original authenticated session has expired and re-authentication is necessary. A response is returned with a third-party application deep link 205. The customer selects the deep link presentation 205 to invoke the third-party application authentication. Instead of repeating the authentication process as previously described, when the customer presses on the deep link presentation 205, the third-party application authentication is invoked which uses the customer's biometrics to re-authenticate. The biometrics may be in the form of a thumbprint, for example, provided by the customer earlier. Once the customer provides the requested biometrics, the authentication response is sent from the third-party application back to the third-party automation platform 125. It should be noted that the third-party application and the third-party automation platform 125 may be part of the same product suite, for example Genesys® Authentication Suite or a similar systems security management platform. Now that the customer has been authenticated, the account balance may be retrieved from the bank through the bank's APIs 135 by the third-party application automation platform 125 and returned to the customer through the messaging application 110. In an embodiment, if the customer decides to continue the interaction after more time has lapsed, they will only have to re-authenticate using their provided biometric, such as a thumbprint.

Figure 3:
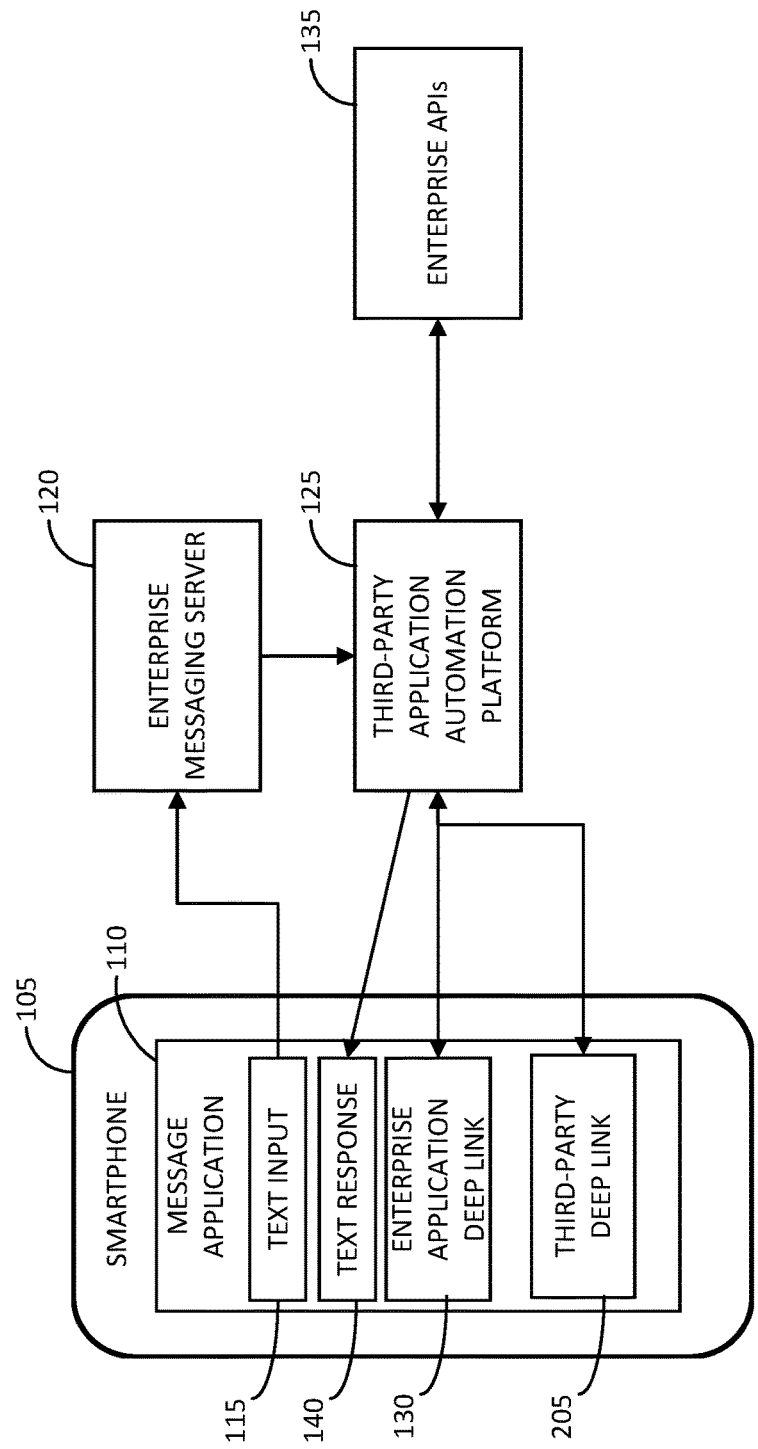
FIG. 3 is a diagram illustrating an embodiment of re-authentication in an asynchronous communication.

FIG. 3 is a diagram illustrating another embodiment of re-authentication in asynchronous communication in an enterprise to consumer communication system, indicated generally at 300. Components of the system 300 might include a smartphone 105, a message application 110 installed on the smartphone 105, a field for text input 115 within the message application 110, an enterprise messaging server 120, a third-party application automation platform 125, an enterprise application deep link 130, enterprise APIs 135, a field for text responses 140, and a third-party deep link 205.

In another embodiment, the customer may be asked to perform the third-party application authentication immediately after the bank authentication. This removes the requirement of the smartphone biometrics and replaces it with a simple PIN. For example, referring to FIG. 3, a banking customer may want to know their account balance. The customer decides to use their smartphone 105 to connect with their bank through a messaging channel A smartphone may comprise Apple Inc.'s iPhone, for example. The connection may be initiated through a smartphone messaging application 110, such as Business Chat by Apple Inc. or a similar service which allows for customer interaction with a business. In a non-limiting example, the customer may initiate a conversation with their bank by typing a message to their bank in the messaging application 110. The customer may type a question, such as "what's my checking account balance" through a text input field 115. The question is received by the enterprise messaging server 120. An example of an enterprise messaging server might include Genesys® Hub, or a similar product capable of allowing customers to connect with enterprises through a number of devices (e.g., tablets, smartphones, smart appliances, smart watches, etc.) and platforms (e.g., social media, messaging applications, etc.). The customer input is analyzed by the enterprise messaging server 120 through NLU and the resulting intent, <Balance Request>, for example, is determined to be handled by an automated response and routed to a third-party application automation platform 125. An example of a third-party application automation platform 125 might include Genesys® Intelligent Automation or a similar platform capable of conversation automation.

The third-party application automation platform 125 determines that the request needs authentication and responds with a deep link 130 to the bank's banking application, which has been downloaded to the customer's smartphone 105. An example of a deep link comprises a direct link to an installed smartphone application. The customer selects the deep link presentation 130 to invoke customer authentication by the banking application. The banking application may appear on the screen and direct the customer to enter details about their banking account related to the requested information. The customer may not have access to the information the banking application needs to complete the authentication. The customer sifts through information to find the details and then inputs the information to the banking application. The inputs are authenticated by the banking application against the bank's backend APIs 135. Because the banking application was initiated by the messaging application, the authentication response is also sent from the banking application back to the third-party application automation platform 125.

The third-party application automation platform 125 prepares the customer for re-authentication and responds with a third-party application deep link 205 to the smartphone 105. The customer selects the deep link presentation 205 to invoke the third-party application authentication. The customer may now be asked to create a PIN for authentication of future conversations. The re-authentication response is returned from the third-party application back to the third-party application automation platform 125. Now that the customer has been authenticated, the account balance may be retrieved from the bank through the bank's API 135 by the third-party application automation platform 125 and returned to the customer through the messaging application 110 as a text response 140.

After some delay, perhaps 45 minutes later, the customer may decide they would like additional information, such as their savings account balance. The customer then messages the bank through the messaging application 110 on their smartphone 105 that they would like to know how much money is in their savings account. In a non-limiting example, the customer may type a message to their bank in the messaging application 110, "what's my savings account balance" through the text input field 115. The customer input is analyzed by the enterprise messaging server 120 through NLU and the resulting intent, <Balance Request>, for example, is determined to be handled by an automated response and routed to a third-party application automation platform 125.

The third-party application automation platform 125 determines that enough time has lapsed that the original authenticated session has expired and re-authentication is necessary. A response is returned with a third-party application deep link 205. The customer selects the deep link presentation 205 to invoke the third-party application authentication and enters the previously selected PIN. Once the customer provides the requested PIN, the authentication response is sent from the third-party application back to the third-party application automation platform 125. It should be noted that the third-party application and the third-party automation platform 125 may be part of the same product suite, for example Genesys® Authentication Suite. Now that the customer has been authenticated, the account balance is retrieved from the bank through the bank's APIs 135 by the third-party application automation platform 125 and the account balance is returned to the customer through the messaging application 110. In an embodiment, if the customer decides to continue the interaction after more time has lapsed, they will only have to re-authenticate using their provided PIN.

Figure 4:
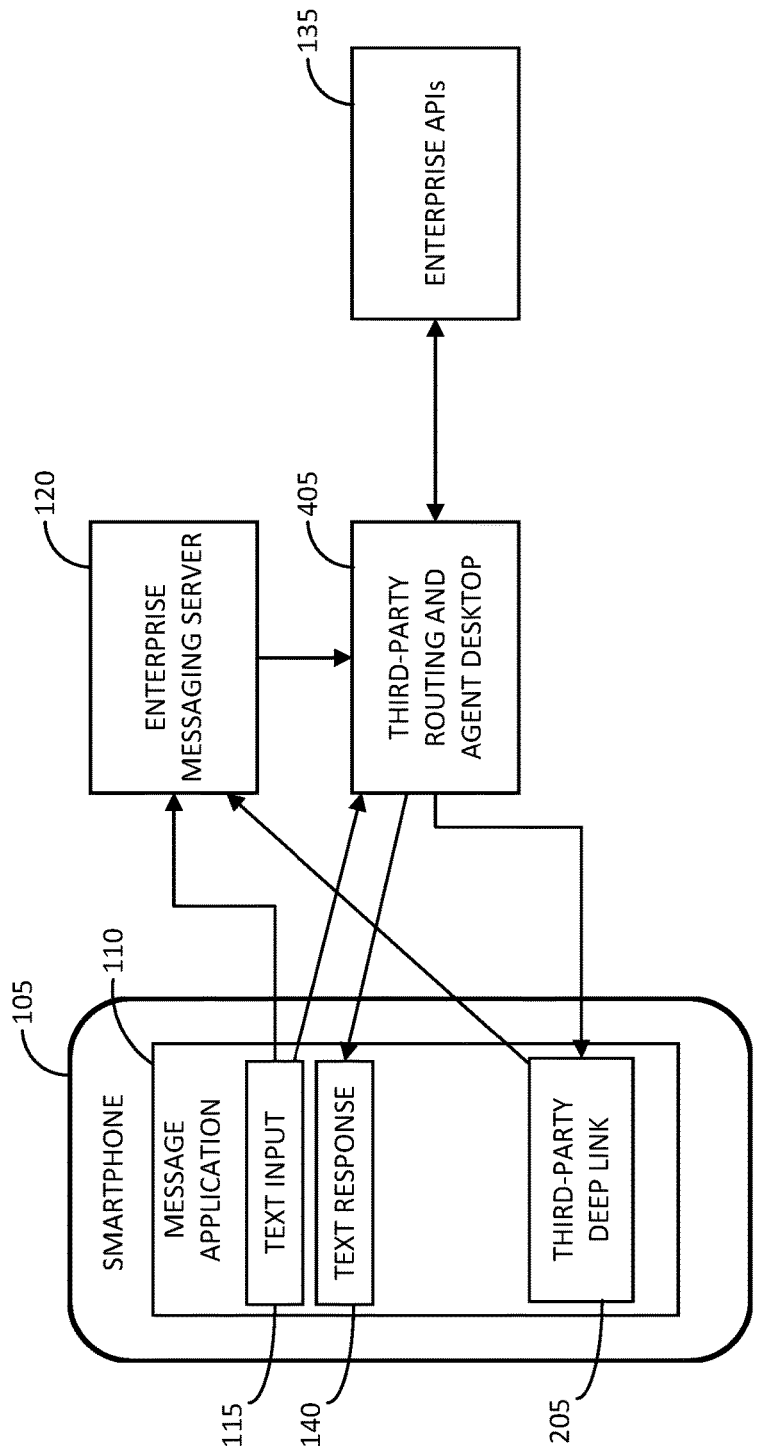
FIG. 4 is a diagram illustrating an embodiment of re-authentication in an asynchronous communication.

FIG. 4 is a diagram illustrating another embodiment of re-authentication in asynchronous communication in an enterprise to consumer communication system, indicated generally at 400. Components of the system 400 might include a smartphone 105, a message application 110 installed on the smartphone 105, a field for text input 115 within the message application 110, an enterprise messaging server 120, a third-party routing and agent desktop service 405, enterprise APIs 135, a field for text responses 140, and a third-party deep link 205.

In another embodiment, the customer may be asked to perform the third-party authentication when working with an agent. For example, referring to FIG. 4, a banking customer may want to know their account balance. The customer decides to use their smartphone 105 to initially connect with their bank through a messaging channel. A smartphone may comprise Apple Inc.'s iPhone, for example. The connection may be initiated through a smartphone messaging application 110, such as Business Chat by Apple Inc. or a similar service which allows for customer interaction with a business. In a non-limiting example, the customer may initiate a conversation with their bank by typing a message to their bank in the messaging application 110. The customer may type a question, such as "what's my checking account balance" through a text input field 115. The question is received by the enterprise messaging server 120. An example of an enterprise messaging server might include Genesys® Hub, or a similar product capable of allowing customers to connect with enterprises through a number of devices (e.g., tablets, smartphones, smart appliances, smart watches, etc.) and platforms (e.g., social media, messaging applications, etc.). The customer input is analyzed by the enterprise messaging server 120 through NLU and the resulting intent, <Balance Request>, for example, is determined to be handled by routing to an agent and routed to an agent desktop 405. The third-party routing and agent desktop 405 service may be part of a contact center system for the enterprise, staffed by a human agent. Once both parties have joined the chat, the agent may determine that the request needs authentication and asks the customer for identifying information, such as the last four digits of the customer's government identification number, for example. The customer provides this information and at this time, the agent may ask the customer for re-authentication, presenting a deep link 205 to the enterprise's application. The customer selects the deep link presentation 205 to invoke customer authentication by the third-party application. The customer may now be asked to create a PIN for authentication of future conversations.

In another embodiment, biometrics may be used instead of a PIN to authenticate the customer. The third-party deep link 205 application may make API calls to the biometric features of the smartphone 105. The biometrics may be in the form of a thumbprint provided by the customer, or facial recognition, heartbeat patterns, speech recognition, etc., to name a few non-limiting examples. Once the customer provides the requested biometrics, the authentication response is sent back to the third-party application automation platform 125.

Returning to the instant example of using a PIN for re-authentication, the re-authentication response is returned from the third-party application back to the third-party automation platform 125. Now that the customer has been authenticated, the account balance and/or other information may be retrieved from the bank through the bank's API 135 and returned to the customer by the agent through the messaging application 110 as a text response 140.

Figure 5:
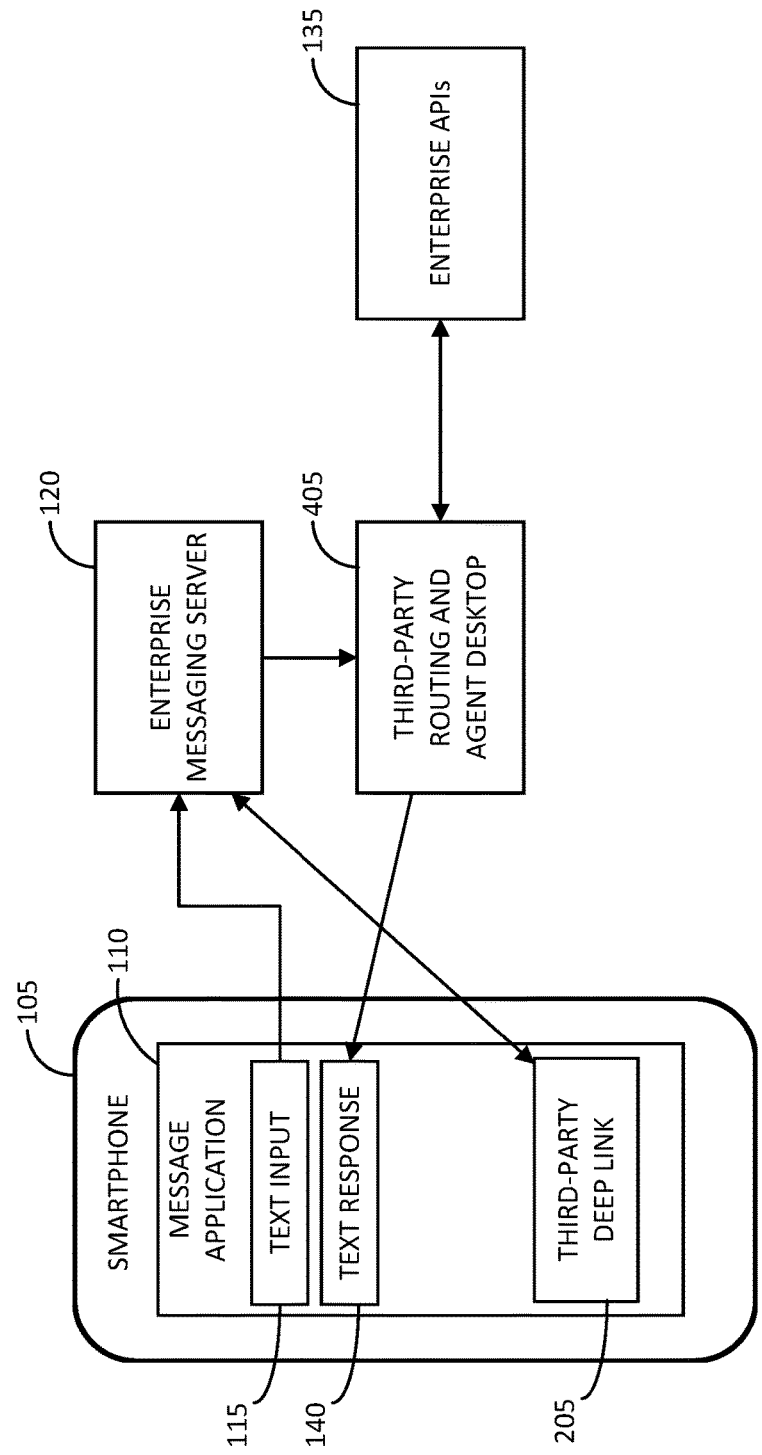
FIG. 5 is a diagram illustrating an embodiment of re-authentication in an asynchronous communication.

After some delay, perhaps 45 minutes later, the customer may decide they would like additional information, such as their savings account balance. Referring now to FIG. 5, the customer then messages the bank through the messaging application 110 on their smartphone 105 that they would like to know how much money is in their savings account. In a non-limiting example, the customer may type a message to their bank in the messaging application 110, "what's my savings account balance" through the text input field 115. The customer input is analyzed by the enterprise messaging server 120 through NLU and the resulting intent, <Balance Request>, for example, is determined to be handled by an automated response 120 and routed to a third-party application automation platform 125.

The third-party application automation platform 125 determines that enough time has lapsed that the original authenticated session has expired and re-authentication is necessary. A response is returned with a third-party application deep link 205. The customer selects the deep link presentation 205 to invoke the third-party application authentication and enters the previously selected PIN. Once the customer provides the requested PIN, the authentication response is sent from the third-party application back to the third-party automation platform 125. The customer input may be determined to be handled by routing to an agent and routed to the agent desktop 405. Now that the customer has been authenticated, the account balance and/or other information may be retrieved from the bank through the bank's API 135 and returned to the customer by the agent through the messaging application 110 as a text response 140.

In the embodiments described, re-authentication may be performed multiple times within a session, depending on the needs of a business or enterprise. For example, after specific time intervals or lengthy pauses in the conversation, authentication may occur. In another embodiment, the business may determine what requirements they have for the initial verification and allow the third-party application automation platform to have its own standards for re-authentication. The third-party application automation platform can keep the continuity of the authentication alive without the business or enterprise's continued involvement in authentication after the initial process is performed.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for authentication in a persistent conversation in an asynchronous communication channel comprising:
providing input by a first party initiating a conversation through an asynchronous communication channel;
receiving the conversation, by an enterprise messaging server, and determining the conversation to be handled by an automated response;
routing, by the enterprise messaging server, the conversation to a third-party application automation platform;
authenticating, by the third-party application automation platform, an identity of the first party and continuing the conversation if the first party is authenticated, otherwise, terminating the conversation;
allowing a period of time to lapse in the conversation where no action is taken by the first party and the authenticating has timed-out;
initiating the conversation by the first party again in the asynchronous communication channel after the period of time;
re-authenticating, by the third-party application automation platform, the identity of the first party using biometric authentication that includes:

providing a deep link for display on a device being used by the first party;

receiving an input from the device of the first party indicating an activation of the deep link by the first party;

in response to the deep link being activated, transmitting call requests to a biometric feature associated with the device of the first party, wherein the call requests facilitate the biometrics authentication of the first party via the biometric feature; and continuing the conversation in the asynchronous communication channel.

2. The method of claim 1, wherein the asynchronous communication channel comprises a messaging application.

3. The method of claim 1, wherein the input comprises at least one of: text and speech to text.

4. The method of claim 1, wherein the enterprise messaging server is capable of allowing customers to connect with enterprises through a plurality of devices and platforms.

5. The method of claim 4, wherein the devices comprise one or more of: tablets, smartphones, smart appliances, smart watches, and laptops.

6. The method of claim 4, wherein the platforms comprise at least one of: a social media platform and a messaging application.

7. The method of claim 1, wherein the third-party application automation platform is capable of conversation automation.

8. The method of claim 1, wherein the deep link comprises a direct link to an installed device application.

9. The method of claim 1, wherein the biometric authentication comprises at least one of: thumbprint, facial recognition, heartbeat patterns, and speech patterns.

10. The method of claim 1, wherein re-authentication occurs after one or more of: set time intervals and a pause in conversation.

11. A method for authentication in a persistent conversation in an asynchronous communication channel comprising:

providing input by a first party initiating a conversation through an asynchronous communication channel;

receiving the conversation, by an enterprise messaging server, and determining the conversation to be handled by an automated response;

routing, by the enterprise messaging server, the conversation to a third-party application automation platform;

authenticating, by the third-party application automation platform, an identity of the first party and continuing the conversation if the first party is authenticated, otherwise, terminating the conversation;

selecting, by the first party, a PIN upon prompting by the third-party application platform;

allowing a period of time to lapse in the conversation where no action is taken by the first party and the authenticating has timed-out;

initiating the conversation by the first party again in the asynchronous communication channel after the period of time;

re-authenticating the identity of the first party, wherein the third-party application authentication is invoked to perform authentication wherein the first party is prompted for the PIN; and continuing the conversation in the asynchronous communication channel.

12. The method of claim 11, wherein the asynchronous communication channel comprises a messaging application.

13. The method of claim 11, wherein the input comprises at least one of: text and speech to text.

14. The method of claim 11, wherein the enterprise messaging server is capable of allowing customers to connect with enterprises through a plurality of devices and platforms.

15. The method of claim 14, wherein the devices comprise one or more of: tablets, smartphones, smart appliances, smart watches, and laptops.

16. The method of claim 14, wherein the platforms comprise at least one of: a social media platform and a messaging application.

17. The method of claim 11, wherein the third-party application automation platform is capable of conversation automation.

18. The method of claim 11, wherein the re-authenticating is performed with a deep link.

19. The method of claim 18, wherein the deep link comprises a direct link to an installed device application.

20. The method of claim 11, wherein re-authentication occurs after one or more of: set time intervals and a pause in conversation.

21. A method for authentication in a persistent conversation in an asynchronous communication channel comprising:

providing input by a first party initiating a conversation through an asynchronous communication channel;

receiving the conversation, by an enterprise messaging server, and determining the conversation to be handled by an automated response;

routing, by the enterprise messaging server, the conversation to a second party, wherein the second party initiates authentication;

authenticating, by a third-party application automation platform, an identity of the first party and continuing the conversation by the second party if the first party is authenticated, otherwise, terminating the conversation;

selecting, by the first party, a PIN upon prompting by the third-party application platform;

allowing a period of time to lapse in the conversation where no action is taken by the first party and the authenticating has timed-out;

initiating the conversation by the first party again in the asynchronous communication channel after the period of time;

re-authenticating the identity of the first party, wherein the third-party application authentication is invoked to perform authentication wherein the first party is prompted for the PIN; and continuing the conversation in the asynchronous communication channel.

22. The method of claim 21, wherein the asynchronous communication channel comprises a messaging application.

23. The method of claim 21, wherein the input comprises at least one of: text and speech to text.

24. The method of claim 21, wherein the enterprise messaging server is capable of allowing customers to connect with enterprises through a plurality of devices and platforms.

25. The method of claim 24, wherein the devices comprise one or more of: tablets, smartphones, smart appliances, smart watches, and laptops.

26. The method of claim 24, wherein the platforms comprise at least one of: a social media platform and a messaging application.

27. The method of claim 21, wherein the third-party application automation platform is capable of conversation automation.

28. The method of claim 21, wherein the re-authenticating is performed with a deep link.

29. The method of claim 28, wherein the deep link comprises a direct link to an installed device application.

30. The method of claim 21, wherein re-authentication occurs after one or more of: set time intervals and a pause in conversation.

* * * * *